US012368510B2

United States Patent
Xie et al.

(10) Patent No.: US 12,368,510 B2
(45) Date of Patent: Jul. 22, 2025

(54) LIGHTWEIGHT OPTICAL ANTENNA, AND METHOD FOR REALIZING ACQUISITION, TRACKING AND POINTING BASED ON SAME

(71) Applicant: XI'AN INSTITUTE OF OPTICS AND PRECISION MECHANICS, CHINESE ACADEMY OF SCIENCES, Shaanxi (CN)

(72) Inventors: Xiaoping Xie, Shaanxi (CN); Xinning Huang, Shaanxi (CN); Wei Wang, Shaanxi (CN); Yiyi Zhao, Shaanxi (CN)

(73) Assignee: XI'AN INSTITUTE OF OPTICS AND PRECISION MECHANICS, CHINESE ACADEMY, Shaanxi (CN)

( * ) Notice: Subject to any disclaimer, the term of this patent is extended or adjusted under 35 U.S.C. 154(b) by 386 days.

(21) Appl. No.: 18/044,258

(22) PCT Filed: Mar. 11, 2021

(86) PCT No.: PCT/CN2021/080092
§ 371 (c)(1),
(2) Date: Mar. 7, 2023

(87) PCT Pub. No.: WO2022/052431
PCT Pub. Date: Mar. 17, 2022

(65) Prior Publication Data
US 2024/0027779 A1    Jan. 25, 2024

(30) Foreign Application Priority Data

Sep. 11, 2020 (CN) .......................... 202010954419.6

(51) Int. Cl.
*H04B 10/118* (2013.01)

(52) U.S. Cl.
CPC .................................. *H04B 10/118* (2013.01)

(58) Field of Classification Search
None
See application file for complete search history.

(56) References Cited

U.S. PATENT DOCUMENTS

| 10,574,973 B2 * | 2/2020 | Hall ...................... H04N 13/383 |
| 11,265,532 B2 * | 3/2022 | Hall ........................ G01S 17/89 |

(Continued)

FOREIGN PATENT DOCUMENTS

| CN | 105759410 A | 7/2016 |
| CN | 106054490 A | 10/2016 |

(Continued)

OTHER PUBLICATIONS

Kaymak et al., A Survey on Acquisition, Tracking, and Pointing Mechanisms for Mobile Free-Space Optical Communications, 2018 (Year: 2018).*

*Primary Examiner* — Jai M Lee
(74) *Attorney, Agent, or Firm* — NKL Law; Allen Xue

(57) ABSTRACT

An optical antenna includes a coarse tracking liquid crystal, a coarse tracking liquid crystal controller, a beam shrinking system, a fine tracking liquid crystal, a fine tracking liquid crystal controller, a beam splitter, a first coupling system, a single-mode optical fiber, a second coupling system, a detector and a data analysis and instruction system. The antenna can be configured to receive a laser beam from a communication target and transmit the laser beam to the communication target. The optical antenna realizes the acquisition, tracking and pointing of the space laser beam by cascade connection of two stages of liquid crystal devices. At the same time, the optical antenna has the advantages of fast beam pointing and short response time by utilizing the (Continued)

deflection of the Bi-stable dual-frequency liquid crystals to realize change of high-precision beam pointing.

9 Claims, 2 Drawing Sheets

(56) References Cited

U.S. PATENT DOCUMENTS

2007/0127926 A1    6/2007   Marioni et al.
2024/0022326 A1*   1/2024   Xie ..................... H04B 10/118

FOREIGN PATENT DOCUMENTS

| CN | 106911381 A | 6/2017 |
| CN | 206349494 U | 7/2017 |
| CN | 107885008 A | 4/2018 |
| CN | 110299940 A | 10/2019 |
| CN | 111316500 A | 6/2020 |
| CN | 112162403 A | 1/2021 |
| CN | 112213872 A | 1/2021 |

* cited by examiner (a) Before voltage is applied  (b) After voltage is applied

LIGHTWEIGHT OPTICAL ANTENNA, AND METHOD FOR REALIZING ACQUISITION, TRACKING AND POINTING BASED ON SAME

FIELD

The present disclosure belongs to the field of space laser communication, and particularly relates to a novel lightweight optical antenna, and a method for realizing acquisition, tracking and pointing of a space laser communication beam based on the optical antenna.

BACKGROUND

Space laser communication has become a necessary technical approach for the backbone-link of a space information network due to the advantages such as high speed and good confidentiality. In recent years, the United States, Europe and China have repeatedly realized in-orbit demonstration and verification of the space laser communication technology between satellites and between satellites and the earth. In order to build a perfect space information network, many demonstration and verification plans related to space laser communication have been deployed at home and abroad.

In the space laser communication system, the optical antenna is the core part of a space laser link establishment and high-speed data stable transmission. The function of the optical antenna is to quickly acquire, track and point (ATP) a laser link to enable the beam be stably and efficiently coupled into a single-mode optical fiber, so that the communication part can demodulate the data.

The existing optical antenna of the space laser communication system mostly adopts a mechanical rotary table, which realize the coarse acquisition and tracking through mechanical rotation of the rotary table, and then realize the fine tracking and pointing based on a tip-tilt mirror which can swing quickly. This mechanical rotary-table-type optical antenna has great size, weight and power (SWaP) consumption, and occupies more than 70% of a space laser terminal SWaP resources, thus has difficulty in meeting the strict SWaP requirements of a space platform for a laser communication terminal, and limits the miniaturization and lightweight progress of the space laser communication terminal. Also, the mechanical rotation process is time-consuming, so that the establishment time of the space laser link is prolonged.

With the maturity of the liquid crystal device, there also have solutions using liquid crystal optical phased array (LCOPA) to realize the ATP of the communication target beams. Although the SWaP of the optical antenna is reduced, the slow response of the used large-angle scanning LCOPA cannot track and point the laser beam in time. Besides, the wedge-shaped dual-frequency LCOPA can improve the response time and achieve high-precision beam pointing, but the different response time at different thicknesses of the wedge limits its practical application. Moreover, the wedge-shaped dual-frequency LCOPA is hard to form a large-area device, so that cannot meet the light receiving area requirements of the optical antenna.

SUMMARY

The purpose of the present disclosure is to provide a novel lightweight optical antenna, and a method for realizing acquisition, tracking and pointing based on same, so as to overcome the problems of great weight and power consumption of a traditional mechanical rotary-table-type optical antenna, slow response of an optical antenna based solely on a liquid crystal phased array, and undersize area and uneven response time of a wedge-shaped dual-frequency liquid crystal phased array.

The technical solution of the present disclosure is to provide a novel lightweight optical antenna, which includes a coarse tracking liquid crystal, a coarse tracking liquid crystal controller, a beam shrinking system, a fine tracking liquid crystal, a fine tracking liquid crystal controller, a beam splitter, a first coupling system, a single-mode optical fiber, a second coupling system, a detector and a data analysis and instruction system;

wherein, the coarse tracking liquid crystal, the beam shrinking system, the fine tracking liquid crystal and the beam splitter are sequentially arranged and located on the same central axis; the beam splitter is placed at an included angle of 135 degrees with the central axis;

the first coupling system and the single-mode optical fiber are sequentially located in one emergent light path of the beam splitter, and the second coupling system and the detector are sequentially located in the other emergent light path of the beam splitter;

an input end of the data analysis and instruction system is connected with the detector, and an output end of the data analysis and instruction system is connected with the coarse tracking liquid crystal controller and the fine tracking liquid crystal controller; the data analysis and instruction system is configured to receive initial position information of a communication target or extract information of a spot on the detector, analyze the initial position information or the spot information, and provide an angle deflection information instruction to the coarse tracking liquid crystal controller and the fine tracking liquid crystal controller;

an output end of the coarse tracking liquid crystal controller is connected with the coarse tracking liquid crystal, and is configured to convert the angle deflection information instruction into a control voltage;

the coarse tracking liquid crystal deflects under the action of the control voltage to realize the large-angle pointing of an incident beam;

the beam shrinking system is configured to reduce or enlarge the diameter of the incident beam;

an output end of the fine tracking liquid crystal controller is connected with the fine tracking liquid crystal, and is configured to convert the angle deflection information instruction into a control voltage;

the fine tracking liquid crystal is packaged by stacking three layers of Bi-stable dual-frequency liquid crystal devices to form a rectangular liquid crystal device, and deflects under the action of the control voltage to realize the small-angle pointing of the incident beam;

the beam splitter is configured to split the incident beam into two beams, which are respectively incident on the first coupling system and the second coupling system;

the first coupling system is configured to converge and couple the beam to the single-mode optical fiber, or convert the beam in the single-mode optical fiber into parallel beams to be incident on the beam splitter;

the second coupling system is configured to converge and transmit the beam to a photosensitive surface of the detector;

the detector realizes beam imaging and outputs the spot information.

Further, in order to share receiving and transmitting, the beam shrinking system is composed of a Maksutov telescopic objective lens and a refractive eyepiece, and a lens and a reflector in the Maksutov telescopic objective lens are both spherical mirrors.

Further, in order to meet the requirement of large light passing area of the optical antenna, each layer of Bi-stable dual-frequency liquid crystal device in the fine tracking liquid crystal includes a first liquid crystal region and a second liquid crystal region from left to right in sequence; control voltages of the first liquid crystal region and the second liquid crystal region are different;

the ratio of the first liquid crystal region to the second liquid crystal region in the first layer of
Bi-stable dual-frequency liquid crystal device is 3:1;
the ratio of the first liquid crystal region to the second liquid crystal region in the second layer of Bi-stable dual-frequency liquid crystal device is 2:2;
the ratio of the first liquid crystal region to the second liquid crystal region in the third layer of Bi-stable dual-frequency liquid crystal device is 1:3.

Further, the beam shrinking proportion of the beam shrinking system is N;
the area of the coarse tracking liquid crystal is N times the area of the fine tracking liquid crystal, wherein N is a natural number.

Further, the first coupling system and the second coupling system each include five optical lenses, wherein the first lens is a system vacuum compensation mirror, and the other four lenses are transmissive optical lenses.

Further, the detector is a CMOS infrared image sensor; the thickness t of the liquid crystal layer should satisfy:

$$t \geq \frac{\lambda}{\Delta n}$$

wherein $\Delta n$ is the birefringence of the liquid crystal material, and $\lambda$ is the free space wavelength.

The present disclosure also provides a method for realizing acquisition, tracking and pointing based on the novel lightweight optical antenna, which includes the following steps:

when the optical antenna is configured to receive a laser beam from a communication target:

Step 1a, receiving, by the data analysis and instruction system, initial position information of the communication target, and providing an angle deflection information instruction to the coarse tracking liquid crystal controller according to a positional relationship between an initial position of the communication target and an initial position of the coarse tracking liquid crystal;

Step 2a, converting, by the coarse tracking liquid crystal controller, the angle deflection information instruction into a control voltage, and controlling the coarse tracking liquid crystal to point to the initial position of the communication target;

Step 3a, enabling the beam of the communication target to pass through the coarse tracking liquid crystal, the beam shrinking system, the fine tracking liquid crystal, the beam splitter and the second coupling system in sequence to generate a spot on the photosensitive surface of the detector;

Step 4a, extracting, by the data analysis and instruction system, information of the spot on the detector, and providing an angle deflection information instruction to the coarse tracking liquid crystal controller according to a positional relationship between the spot position and the center of the detector; converting, by the coarse tracking liquid crystal controller, the angle deflection information instruction into a control voltage, and controlling the coarse tracking liquid crystal to deflect;

Step 5a, repeating steps 3a to 4a until the spot is located at the center of the detector, wherein the allowable deviation is less than or equal to a pixels, pixel is the smallest imaging unit of the detector, and the energy is the strongest; wherein a is a positive number;

Step 6a, reducing, by the beam shrinking system, the diameter of the beam transmitted by the coarse tracking liquid crystal and outputting parallel beams, and enabling all of the parallel beams to be transmitted through the fine tracking liquid crystal and then pass through the beam splitter and the second coupling system in sequence to generate spots on the photosensitive surface of the detector;

Step 7a, extracting, by the data analysis and instruction system, spot information output by the detector, and providing an angle deflection information instruction to the fine tracking liquid crystal controller according to a positional relationship between the spot position and the center position of the detector;

Step 8a, converting, by the fine tracking liquid crystal controller, the angle deflection information instruction in step 7a into a control voltage, and controlling the fine tracking liquid crystal to point to a specific position;

Step 9a, repeating steps 6a, 7a and 8a until the spots on the detector are always stabilized at the center position of the detector without drift, wherein the allowable deviation is smaller than or equal to b pixels, and pixel is the smallest imaging unit of the detector, wherein b is a positive number smaller than a; and Step 10a, converging and coupling, by the first coupling system, the beams transmitted by the beam splitter into the single-mode optical fiber;

when the optical antenna is configured to transmit the laser beam to the communication target:

Step 1b, receiving, by the data analysis and instruction system, initial position information of the communication target, and providing an angle deflection information instruction to the coarse tracking liquid crystal controller according to a positional relationship between an initial position of the communication target and an initial position of the coarse tracking liquid crystal;

Step 2b, converting, by the coarse tracking liquid crystal controller, the angle deflection information instruction in step 1b into a control voltage, and controlling the coarse tracking liquid crystal to point to the initial position of the communication target;

Step 3b, enabling a beacon beam of the communication target to pass through the coarse tracking liquid crystal, the beam shrinking system, the fine tracking liquid crystal, the beam splitter and the second coupling system in sequence to generate a spot on the photosensitive surface of the detector;

Step 4b, extracting, by the data analysis and instruction system, spot information output by the detector, and providing an angle deflection information instruction to the coarse tracking liquid crystal controller according to a positional relationship between the spot position and the center of the detector; converting, by the coarse tracking liquid crystal controller, the angle deflection information instruction into a control voltage, and controlling the coarse tracking liquid crystal to deflect;

Step 5b, repeating steps 3b to 4b until the spot is located at the center of the detector, wherein the allowable deviation is small than or equal to a pixels, pixel is the smallest imaging unit of the detector, and the energy is the strongest; wherein a is a positive number;

Step 6b, reducing, by the beam shrinking system, the diameter of the beam transmitted by the coarse tracking liquid crystal and outputting parallel beams, and enabling all of the parallel beams to be transmitted through the fine tracking liquid crystal and then pass through the beam splitter and the second coupling system in sequence to generate spots on the photosensitive surface of the detector;

Step 7b, extracting, by the data analysis and instruction system, spot information output by the detector, and providing an angle deflection information instruction to the fine tracking liquid crystal controller according to a positional relationship between the spot position and the center position of the detector;

Step 8b, converting, by the fine tracking liquid crystal controller, the angle deflection information instruction in step 7b into a control voltage, so that the fine tracking liquid crystal points to a specific position;

Step 9b, repeating steps 6b, 7b and 8b until the spots on the detector are always stabilized at the center position of the detector without drift, wherein the allowable deviation is smaller than or equal to b pixels, and pixel is the smallest imaging unit of the detector, wherein b is a positive number smaller than a;

Step 10b, converting, by the first coupling system, an output beam of the single-mode optical fiber into space parallel beams, and then transmitting the space parallel beams to the beam shrinking system through the beam splitter and the fine tracking liquid crystal;

Step 11b, enlarging, by the beam shrinking system, the beam diameters so that all the output parallel beams are incident on the coarse tracking liquid crystal;

Step 12b, deflecting, by the coarse tracking liquid crystal, the beams to the direction of the communication target to establish a space laser link.

Further, in step 6a, the beam shrinking system reduces the diameters of the beams transmitted by the coarse tracking liquid crystal by N times;

in step 11b, the beam shrinking system enlarges the beam diameters by N times.

Further, b≤1/5.

The present disclosure has the advantages that:

(1) the optical antenna of the present disclosure is small in size, light in weight, low in power consumption, fast in beam pointing and short in response time;

the novel lightweight optical antenna provided by the present disclosure realizes the acquisition, tracking and pointing of space laser beams by cascade connection of two stages of liquid crystal devices. The novel lightweight optical antenna has the characteristics of small size, light weight and low power consumption compared with the mechanical rotary-table-type optical antenna, and is beneficial to the optimization of resources such as size, weight, power consumption and the control of development cost of space laser communication terminals. At the same time, the optical antenna has the advantages of fast beam pointing and short response time by utilizing the deflection of the Bi-stable dual-frequency liquid crystals to realize change of high-precision beam pointing;

(2) the requirement of large light passing area of the optical antenna is met;

according to the present disclosure, the beam shrinking system is adopted to realize the reduction (when receiving) or enlargement (when transmitting) of the space beam diameter, and the small-area Bi-stable dual-frequency liquid crystals are utilized to realize the high-precision beam pointing, which not only meets the requirement of large light passing area of the optical antenna, but also effectively solves the problem that it is difficult to make the wedge-shaped dual-frequency liquid crystal material for fine tracking into a large-area device;

(3) the response time of all parts of the surface of the fine tracking liquid crystal of the present disclosure is consistent, and the tracking accuracy is high;

the fine tracking liquid crystal of the present disclosure adopts a packaging method of staggered stacking of three layers of Bi-stable liquid crystal devices, so that the thickness of the fine tracking liquid crystal is uniform, and the response time of all parts of the surface is consistent, thus effectively avoid the influence of a wedge-shaped packaging method on the tracking accuracy of the optical antenna due to different response time at different thicknesses;

(4) the optical antenna of the present disclosure is simple in structure and low in manufacturing cost;

according to the present disclosure, a single acquisition, tracking and pointing branch and a single detector are adopted to realize the all functions of the optical antenna, so that the system complexity and the engineering cost of the optical antenna are greatly reduced.

1—coarse tracking liquid crystal, 2—coarse tracking liquid crystal controller, 3—beam shrinking system, 4—fine tracking liquid crystal, 5—fine tracking liquid crystal controller, 6—beam splitter, 7—first coupling system, 8—single-mode optical fiber, 9—second coupling system, 10—detector, 11—data analysis and instruction system.

Figure 2:
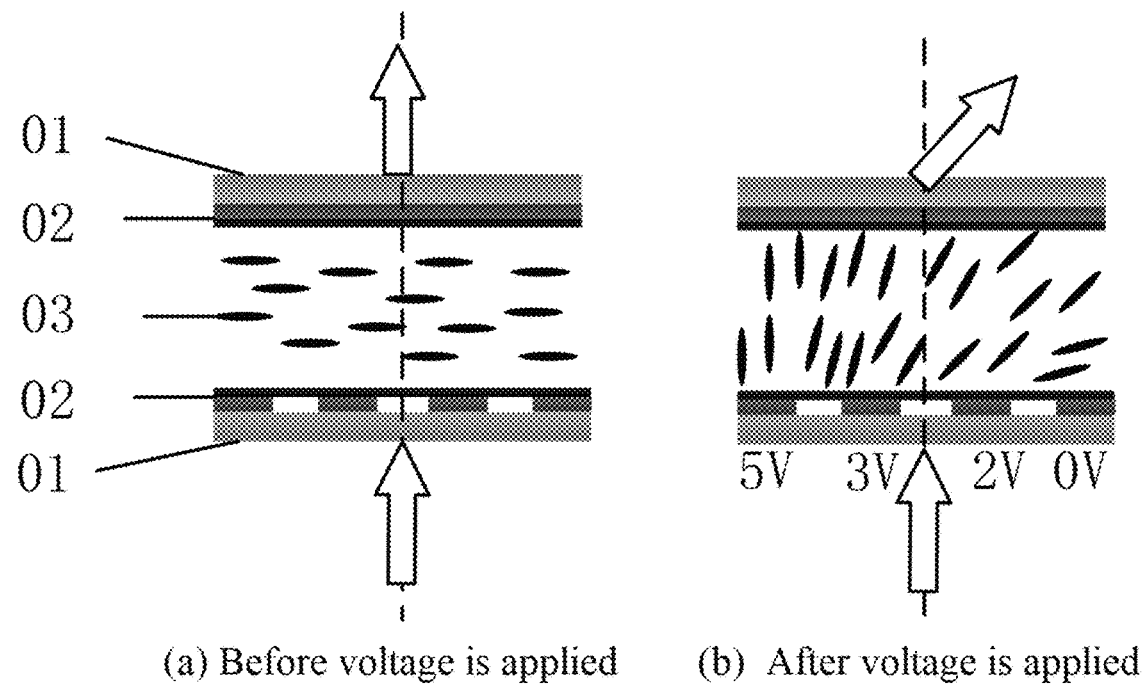

FIG. 2 is a schematic diagram of the working principle of a liquid crystal device of the present disclosure; wherein (a) is the state of the liquid crystal device before voltage is applied, and (b) is the state of the liquid crystal device after voltage is applied;

reference numerals in the figure are: 01—substrate, 02—electrode layer and 03—liquid crystal material.

Figure 3:
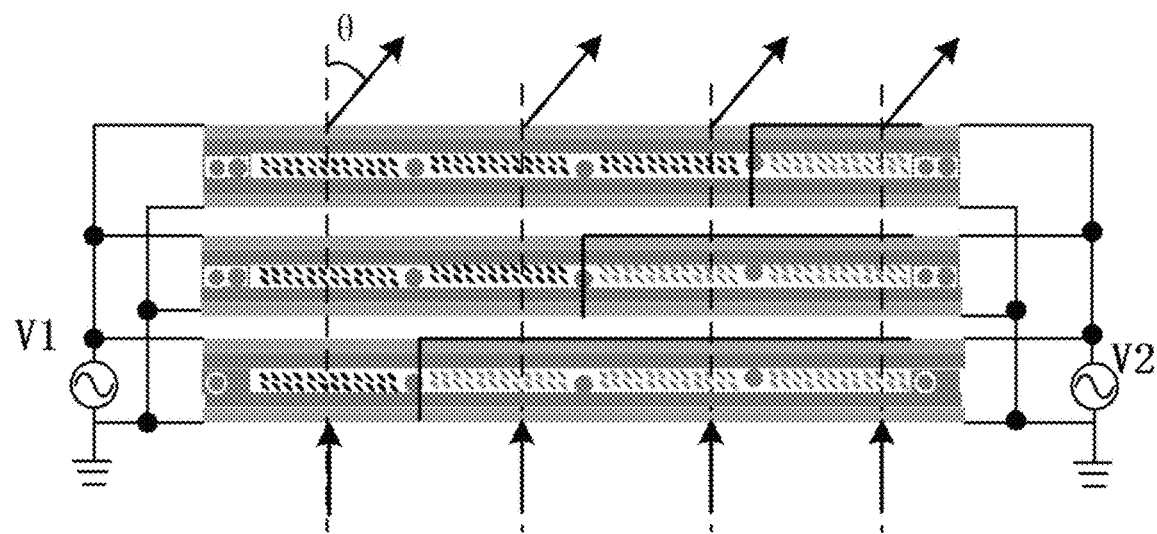

FIG. 3 is a schematic diagram of the packaging method of a fine tracking liquid crystal of the present disclosure.

DETAILED DESCRIPTION OF THE EMBODIMENTS

The present disclosure will be further described with reference to the following drawings and specific embodiments.

Figure 1:
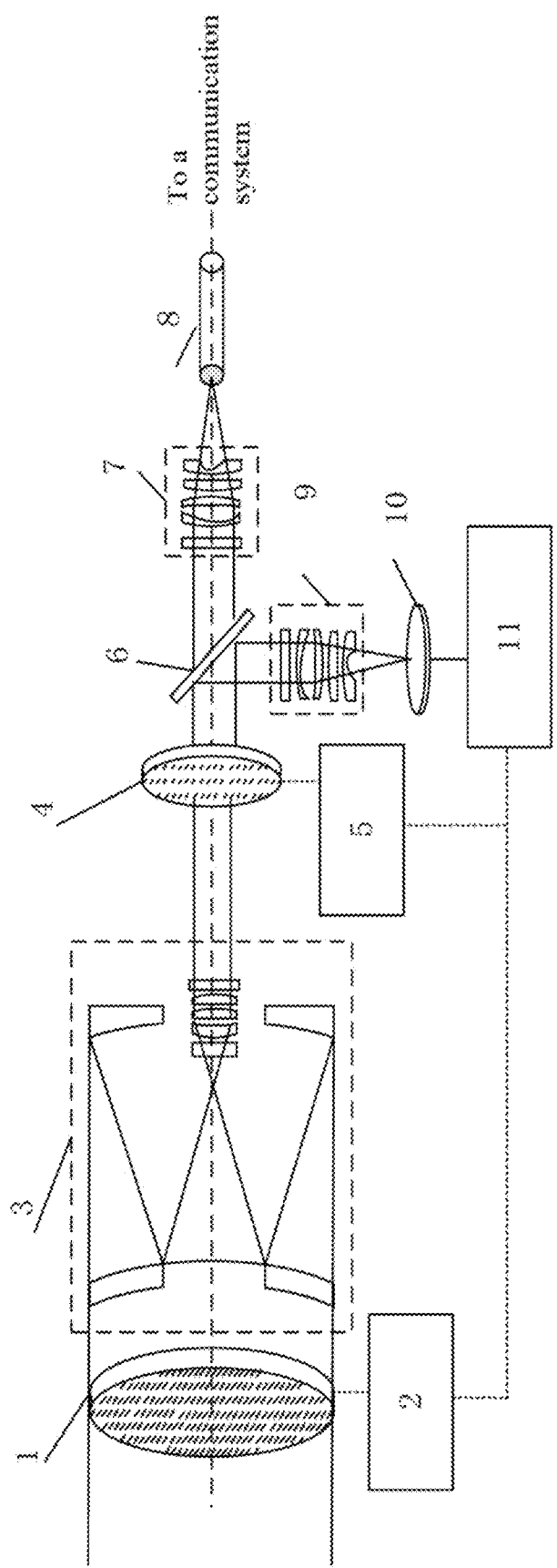
FIG. 1 is a schematic diagram of an optical antenna system in an embodiment of the present disclosure; wherein reference numerals in the figure are.

Referring to FIG. 1, a novel lightweight optical antenna of this embodiment is configured to establish a laser link between two laser terminals in space, and specifically includes a coarse tracking liquid crystal 1, a coarse tracking liquid crystal controller 2, a beam shrinking system 3, a fine tracking liquid crystal 4, a fine tracking liquid crystal controller 5, a beam splitter 6, a first coupling system 7, a single-mode optical fiber 8, a second coupling system 9, a detector 10 and a data analysis and instruction system 11.

Wherein the coarse tracking liquid crystal 1, the beam shrinking system 3, the fine tracking liquid crystal 4, the beam splitter 6, the first coupling system 7 and the single-mode optical fiber 8 are sequentially arranged from left to right and are located on the same central axis; the beam splitter 6 is placed at an angle of 135 degrees with the central axis. It can be seen from the figure that the first coupling system 7 and the single-mode optical fiber 8 are sequentially located in the transmitted light path of the beam splitter 6, and the second coupling system 9 and the detector 10 are sequentially located in the reflected light path of the beam splitter 6. Of course, in other embodiments, the first coupling system 7 and the single-mode optical fiber 8 may be located in the reflected light path of the beam splitter 6, while the second coupling system 9 and the detector 10 may be located in the transmitted light path of the beam splitter 6. The input end of the data analysis and instruction system 11 is connected to the detector 10, and the output end of the data analysis and instruction system 11 is connected to the coarse tracking liquid crystal controller 2 and the fine tracking liquid crystal controller 5. The data analysis and instruction system 11 is configured to receive initial position information of a communication target or extract information of a spot on the detector 10, analyze the initial position information or the spot information, and provide an angle deflection information instruction to the coarse tracking liquid crystal controller 2 and the fine tracking liquid crystal controller 5; the coarse tracking liquid crystal controller 2 is configured to convert the angle deflection information instruction into a control voltage, and control the coarse tracking liquid crystal 1 to deflect so as to realize the large-angle pointing of an incident beam; the beam shrinking system 3 is configured to reduce or enlarge the diameter of the incident beam by N times, so correspondingly, the area of the coarse tracking liquid crystal 1 is N times the area of the fine tracking liquid crystal 4. In this embodiment, the beam shrinking system 3 is composed of a Maksutov telescopic objective lens and a refractive eyepiece, and lenses and reflectors are both spherical. The system can be shared by both receiving and transmitting, and the wave aberration can be controlled in the range of ≤0.005λ (λ is the laser wavelength). The fine tracking liquid crystal controller 5 is configured to convert the angle deflection information instruction into a control voltage, and controls the fine tracking liquid crystal 4 to deflect so as to realize the small-angle, high-precision and fast-response pointing of the incident beam. The beam splitter 6 adopts the energy beam splitting method to transmit one part of energy of the incident beam to the first coupling system 7 and reflect the other part of energy to the second coupling system 9; the first coupling system 7 is configured to converge and couple the beam to the single-mode optical fiber 8; the second coupling system 9 is configured to converge and transmit the beam to a photosensitive surface of the detector 10; the detector 10 realizes beam imaging, and outputs information such as position, power distribution and size of the spot. In this embodiment, the first coupling system 7 and the second coupling system 9 each include five optical lenses, the first lens is a system vacuum compensation lens, and the other four lenses are transmissive optical lenses. The lens that the beam reaches first is defined as the first lens. The detector 10 is a CMOS infrared image sensor.

In the present disclosure, the working principle of the coarse tracking liquid crystal 1 and the fine tracking liquid crystal 4 is shown in FIG. 2:

a liquid crystal material 03 is poured between two pieces of glass (called substrate 01) each provided with an electrode layer 02, wherein the electrode layer 02 of one substrate 01 is composed of a plurality of electrodes, which are separated and independent from each other, and each electrode is connected to the liquid crystal controller through leads. When a voltage is applied, the liquid crystal molecules located between the two substrates 01 will be reoriented (tend to be oriented in the direction of an electric field) due to polarization, and their refractive indices will also change. The electrodes are grouped with M as a cycle, and the refractive indices distributed according to the sawtooth function can be formed in a certain direction of a liquid crystal panel by applying a voltage with nearly sawtooth distribution to each electrode in each cycle, thus forming a liquid crystal blazed grating. After the laser beam is incident from a transparent electrode and passes through the liquid crystal material 03, pointing deflection of the laser beam can be realized. In order to control the deflection angle of the beam passing through the liquid crystal, it is required that the thickness of the liquid crystal layer should be able to generate phase delay of more than 2π, so the thickness t of the liquid crystal layer should satisfy:

$$t \geq \frac{\lambda}{\Delta n}$$

wherein Δn is the birefringence of the liquid crystal material, and λ is the free space wavelength. Taking the nematic liquid crystal material E7 in the visible and near infrared bands as an example, its birefringence Δn is about 0.2, and when the wavelength is 1.55 μm, the required 2π radian phase delay can be generated when the thickness of the liquid crystal layer is 8 μm. Therefore, realizing beam deflection based on this liquid crystal device can greatly reduce the size, weight, power consumption and other resources of the optical antenna, and the cost can also be greatly reduced.

As shown in FIG. 3, in this embodiment, the fine tracking liquid crystal 4 is packaged into a rectangle by stacking three layers of Bi-stable dual-frequency liquid crystal devices in a staggered manner. (In FIG. 1, because the beam shrinking system is circular, the effective light transmission area of the fine tracking liquid crystal 4 is circular in actual use, as shown in FIG. 1), wherein each layer of Bi-stable dual-frequency liquid crystal device includes two regions, and control voltages of the two regions are different; in addition, the partition ratios of all layers of Bi-stable dual-frequency liquid crystal devices are different. As shown in FIG. 3, the first layer of Bi-stable dual-frequency liquid crystal device, the second layer of Bi-stable dual-frequency liquid crystal device and the third layer of Bi-stable dual-frequency liquid crystal device are sequentially arranged from top to bottom. The partition ratio of the first layer of Bi-stable dual-frequency liquid crystal device is 3:1, that is, the ratio of the region with the control voltage being V1 to the region with the control voltage being V2 is 3:1, and the region with the control voltage being V1 and the region with the control voltage being V2 are sequentially arranged from left to right; similarly, the partition ratio of the second layer of Bi-stable dual-frequency liquid crystal device is 2:2, and the region with the control voltage being V1 and the region with the control voltage being V2 are also sequentially arranged from left to right; the partition ratio of the third layer of Bi-stable dual-frequency liquid crystal device is 1:3, and the region with the control voltage being V1 and the region with the control voltage being V2 are sequentially arranged from left to right; as a whole, the packaged rectangular fine tracking liquid crystal device may be regarded as being composed of two wedge-shaped dual-frequency liquid crystals with different control voltages. Of course, the region with the control voltage being V2 may also be located in the left half of each layer of Bi-stable dual-frequency liquid crystal device; and the region with the control voltage being V1 is located in the right half of each layer of Bi-stable dual-frequency liquid crystal device.

The packaging method of staggered stacking of three layers of Bi-stable liquid crystal devices ensures the uniform thickness of the fine tracking liquid crystal 4 and the consistent response time at all parts of the surface, thus effectively avoiding the influence of the conventional wedge-shaped packaging method on the tracking accuracy of the optical antenna due to the different response time at different thicknesses.

Based on the above-mentioned novel lightweight optical antenna, the acquisition, tracking and pointing of a space laser beam can be realized. When the optical antenna is configured to receive a laser beam from a communication target:

1) the data analysis and instruction system 11 receives initial position information of the communication target, analyzes the positional relationship between an initial position of the communication target and an initial position of the coarse tracking liquid crystal 1, and provides an angle deflection information instruction to the coarse tracking liquid crystal controller 2;
2) the coarse tracking liquid crystal controller 2 obtains the angle deflection information instruction in step 1) and converts the angle deflection information instruction into a control voltage, so that the coarse tracking liquid crystal 1 points to the initial position of the communication target;
3) the beam of the communication target enters the field of view of the optical antenna, and passes through the coarse tracking liquid crystal 1, the beam shrinking system 3, the fine tracking liquid crystal 4, the beam splitter 6 and the second coupling system 9 in sequence to generate a spot on the photosensitive surface of the detector 10;
4) after extracting spot information output by the detector 10, the data analysis and instruction system 11 provides an angle deflection information instruction to the coarse tracking liquid crystal controller 2 according to the offset of the spot position relative to the center of the detector 10; the coarse tracking liquid crystal controller 2 converts the angle deflection information instruction into a control voltage, and controls the coarse tracking liquid crystal 1 to deflect again to point to the initial position of the communication target;

steps 3) to 4) are repeated until the spot position is located at the center of the detector 10 and the energy is the strongest; because the above steps belong to coarse tracking, in this embodiment, it is only necessary to ensure that the allowable deviation between the spot position and the center position of the detector 10 is <1 pixel.

6) the beam shrinking system 3 reduces the diameter of the beam transmitted by the coarse tracking liquid crystal 1 by N times, and outputs parallel beams with good image quality to the surface of the fine tracking liquid crystal 4; after passing through the beam splitter 6 and the second coupling system 9 in sequence, the parallel beams generate spots on the photosensitive surface of the detector 10;
7) the data analysis and instruction system 11 extracts spot information output by the detector 10, and provides an angle deflection information instruction to the fine tracking liquid crystal controller 5 according to the offset of the spot position relative to the center of the detector 10; 8) the fine tracking liquid crystal controller 5 converts the angle deflection information instruction in step 7) into a control voltage, so that the fine tracking liquid crystal 4 points to a specific position;
9) steps 6), 7) and 8) are repeated until the spots on the detector 10 are always stabilized at the center position of the detector 10 without drift; the main function of fine tracking is to further restrain and correct the residual error of a coarse tracking loop, so as to meet the final alignment and tracking accuracy requirements of the optical antenna. Therefore, this embodiment needs to ensure that the deviation between the spot position and the center position of the detector 10 is <1/5 pixel.
10) the first coupling system 7 converges the spots transmitted by the beam splitter 6 and injects the converged spot into the single-mode optical fiber 8, so that the subsequent communication system can perform data processing.

When the optical antenna is configured to transmit the laser beam to the communication target:

1) the data analysis and instruction system 11 receives initial position information of the communication target, and provides an angle deflection information instruction to the coarse tracking liquid crystal controller 2 according to the positional relationship between the initial position of the communication target and the initial position of the coarse tracking liquid crystal 1;
2) the coarse tracking liquid crystal controller 2 obtains the angle deflection information instruction in step 1) and converts the angle deflection information instruction into a control voltage, so that the coarse tracking liquid crystal 1 points to the initial position of the communication target;
3) a beacon beam of the communication target enters the field of view of the optical antenna, and passes through the coarse tracking liquid crystal 1, the beam shrinking system 3, the fine tracking liquid crystal 4, the beam splitter 6 and the second coupling system 9 in sequence to form a spot on the photosensitive surface of the detector 10;
4) after extracting spot information output by the detector 10, the data analysis and instruction system 11 provides an angle deflection information instruction to the coarse tracking liquid crystal controller 2 according to the positional relationship between the spot position and the center position of the detector 10; the coarse tracking liquid crystal controller 2 converts the angle deflection information instruction into a control voltage and controls the coarse tracking liquid crystal 1 to deflect;
5) steps 3) to 4) are repeated until the spot position is located at the center of the detector 10 and the energy is the strongest; in this embodiment, it is only necessary to ensure that the allowable deviation between the spot position and the center position of the detector 10 is ≤1 pixel.

6) the beam shrinking system 3 reduces the diameter of the beam transmitted by the coarse tracking liquid crystal 1, and outputs parallel beams, and all of the parallel beams are transmitted through the fine tracking liquid crystal 4, and then pass through the beam splitter 6 and the second coupling system 9 in sequence to generate spots on the photosensitive surface of the detector 10;

7) the data analysis and instruction system 11 extracts spot information output by the detector 10, and provides an angle deflection information instruction to the fine tracking liquid crystal controller 5 according to the positional relationship between the spot position and the center position of the detector 10, that is, according to the offset of the spot position relative to the center of the detector 10;

8) the fine tracking liquid crystal controller 5 converts the angle deflection information instruction in step 7) into a control voltage, so that the fine tracking liquid crystal 4 points to a specific position;

9) steps 6), 7) and 8) are repeated until the spots on the detector 10 are always stabilized at the center position of the detector 10 without drift; in this embodiment, this step needs to ensure that the deviation between the spot position and the center position of the detector 10 is ≤1/5 pixel.

10) an output beam of the single-mode optical fiber 8 is converted into space parallel beams by the second coupling system 9, and then the space parallel beams are transmitted to the beam shrinking system 3 through the beam splitter 6 and the fine tracking liquid crystal 4;

11) the beam shrinking system 3 enlarges the beam diameters by N times, and outputs parallel beams with good image quality to the coarse tracking liquid crystal 1;

12) the coarse tracking liquid crystal 1 deflects the beams to the direction of the communication target to establish a space laser link.

The above embodiments show that the novel lightweight optical antenna provided by the present disclosure realizes the acquisition, tracking and pointing of the space laser beam by cascade connection of two stages of liquid crystal devices, has the characteristics of small size, light weight and low power consumption compared with the mechanical rotary-table-type optical antenna, and is beneficial to the optimization of the size, weight, power consumption and other resources of the space laser communication terminal and the control of the development cost; and the optical antenna has the advantages of short response time by utilizing the deflection of the dual-frequency liquid crystals to realize change of high-precision beam pointing. At the same time, the present disclosure adopts the beam shrinking system to realize the reduction (when receiving) or enlargement (when transmitting) of the space beam diameter, and utilizes the small-area Bi-stable dual-frequency liquid crystals to realize the high-precision beam pointing, thus effectively solving the problem that it is difficult to make the wedge-shaped dual-frequency liquid crystal material for fine tracking into a large-area device. In the present disclosure, the fine tracking liquid crystal adopts a packaging method of staggered stacking of three layers of Bi-stable liquid crystal devices, so that it is ensured that the thickness of the fine tracking liquid crystal is uniform, and the response time of all parts of the surface is consistent, and the influence of the wedge-shaped packaging method on the tracking accuracy of the optical antenna due to different response time at different thicknesses is effectively avoided; in addition, the present disclosure adopts a single acquisition, tracking and pointing branch and a single detector to realize the two functions of beam acquisition, tracking and pointing of the optical antenna, which greatly reduces the system complexity and engineering implementation cost of the optical antenna.

What is claimed is:

1. A novel lightweight optical antenna, comprising a coarse tracking liquid crystal (1), a coarse tracking liquid crystal controller (2), a beam shrinking system (3), a fine tracking liquid crystal (4), a fine tracking liquid crystal controller (5), a beam splitter (6), a first coupling system (7), a single-mode optical fiber (8), a second coupling system (9), a detector (10) and a data analysis and instruction system (11);

wherein the coarse tracking liquid crystal (1), the beam shrinking system (3), the fine tracking liquid crystal (4) and the beam splitter (6) are arranged in sequence and are located on the same central axis; the beam splitter (6) is placed at an included angle of 135 degrees with the central axis;

the first coupling system (7) and the single-mode optical fiber (8) are sequentially located in a first emergent light path of the beam splitter (6), and the second coupling system (9) and the detector (10) are sequentially located in a second emergent light path of the beam splitter (6);

an input end of the data analysis and instruction system (11) is connected with the detector (10), and an output end of the data analysis and instruction system (11) is connected with the coarse tracking liquid crystal controller (2) and the fine tracking liquid crystal controller (5); the data analysis and instruction system (11) is configured to receive initial position information of a communication target or extract information of a spot on the detector (10), analyze the initial position information or the spot information, and provide an angle deflection information instruction to the coarse tracking liquid crystal controller (2) and the fine tracking liquid crystal controller (5);

an output end of the coarse tracking liquid crystal controller (2) is connected with the coarse tracking liquid crystal (1), and is configured to convert the angle deflection information instruction into a control voltage;

the coarse tracking liquid crystal (1) deflects under the action of the control voltage to realize a large-angle pointing of an incident beam;

the beam shrinking system (3) is configured to reduce or enlarge the diameter of the incident beam;

an output end of the fine tracking liquid crystal controller (5) is connected with the fine tracking liquid crystal (4), and is configured to convert the angle deflection information instruction into the control voltage;

the fine tracking liquid crystal (4) is packaged by stacking three layers of Bi-stable dual-frequency liquid crystal devices to form a rectangular liquid crystal device, and deflects under the action of the control voltage to realize a small-angle pointing of the incident beam;

the beam splitter (6) is configured to split the incident beam into two beams, which are respectively incident on the first coupling system (7) and the second coupling system (9);

the first coupling system (7) is configured to converge and couple the beam to the single-mode optical fiber (8); or convert the beam in the single-mode optical fiber (8) into parallel light to be incident on the beam splitter (6);

the second coupling system (9) is configured to converge and transmit the beam to a photosensitive surface of the detector (10); and the detector (10) realizes beam imaging and outputs the spot information.

2. The novel lightweight optical antenna according to claim 1, wherein the beam shrinking system (3) is composed of a Maksutov telescopic objective lens and a refractive eyepiece, and a lens and a reflector in the Maksutov telescopic objective lens are both spherical mirrors.

3. The novel lightweight optical antenna according to claim 1, wherein each layer of Bi-stable dual-frequency liquid crystal device in the fine tracking liquid crystal (4) comprises a first liquid crystal region and a second liquid crystal region from left to right in sequence; a control voltage of the first liquid crystal region and a control voltage of the second liquid crystal region are different;

a ratio of the first liquid crystal region to the second liquid crystal region in the first layer of Bi-stable dual-frequency liquid crystal device is 3:1;

a ratio of the first liquid crystal region to the second liquid crystal region in the second layer of Bi-stable dual-frequency liquid crystal device is 2:2; and a ratio of the first liquid crystal region to the second liquid crystal region in the third layer of Bi-stable dual-frequency liquid crystal device is 1:3.

4. The novel lightweight optical antenna according to claim 3, wherein a beam shrinking proportion of the beam shrinking system (3) is N; and the area of the coarse tracking liquid crystal (1) is N times the area of the fine tracking liquid crystal (4), wherein N is a natural number.

5. The novel lightweight optical antenna according to claim 4, wherein the first coupling system (7) and the second coupling system (9) each comprises a system vacuum compensation lens and four transmissive optical lenses.

6. The novel lightweight optical antenna according to claim 5, wherein the detector (10) is a CMOS infrared image sensor;

the thickness t of the liquid crystal layer satisfies:

$$t \geq \frac{\lambda}{\Delta n}$$

wherein $\Delta n$ is the birefringence of the liquid crystal material, and $\lambda$ is the free space wavelength.

7. A method for realizing acquisition, tracking and pointing based on the novel lightweight optical antenna according to claim 1, comprising the following steps:

when the optical antenna is configured to receive a laser beam from a communication target:

Step 1a, receiving, by the data analysis and instruction system (11), initial position information of the communication target, and providing an angle deflection information instruction to the coarse tracking liquid crystal controller (2) according to a positional relationship between an initial position of the communication target and an initial position of the coarse tracking liquid crystal (1);

Step 2a, converting, by the coarse tracking liquid crystal controller (2), the angle deflection information instruction into a control voltage, and controlling the coarse tracking liquid crystal (1) to point to the initial position of the communication target;

Step 3a, enabling the beam of the communication target to pass through the coarse tracking liquid crystal (1), the beam shrinking system (3), the fine tracking liquid crystal (4), the beam splitter (6) and the second coupling system (9) in sequence to generate a spot on the photosensitive surface of the detector (10);

Step 4a, extracting, by the data analysis and instruction system (11), information of the spot on the detector (10), and providing an angle deflection information instruction to the coarse tracking liquid crystal controller (2) according to a positional relationship between the spot position and the center of the detector (10); converting, by the coarse tracking liquid crystal controller (2), the angle deflection information instruction into a control voltage, and controlling the coarse tracking liquid crystal (1) to deflect;

Step 5a, repeating steps 3a to 4a until the spot position is located at the center of the detector (10), wherein the allowable deviation is less than or equal to a first positive number of pixels, a pixel being the smallest imaging unit of the detector (10) having the strongest energy;

Step 6a, reducing, by the beam shrinking system (3), the diameter of the beam transmitted by the coarse tracking liquid crystal (1) and outputting parallel beams, and enabling all of the parallel beams to be transmitted through the fine tracking liquid crystal (4) and then pass through the beam splitter (6) and the second coupling system (9) in sequence to generate spots on the photosensitive surface of the detector (10);

Step 7a, extracting, by the data analysis and instruction system (11), spot information output by the detector (10), and providing an angle deflection information instruction to the fine tracking liquid crystal controller (5) according to a positional relationship between the spot position and the center position of the detector (10);

Step 8a, converting, by the fine tracking liquid crystal controller (5), the angle deflection information instruction in step 7a into a control voltage, and controlling the fine tracking liquid crystal (4) to point to a specific position;

Step 9a, repeating steps 6a, 7a and 8a until the spots on the detector (10) are stabilized at the center of the detector (10) without drift, wherein the allowable deviation is smaller than or equal to a second positive number of pixels, wherein the second positive number smaller than the first positive number; and Step 10a, converging and coupling, by the first coupling system (7), the beams transmitted by the beam splitter (6) into the single-mode optical fiber (8);

when the optical antenna is configured to transmit the laser beam to the communication target:

Step 1b, receiving, by the data analysis and instruction system (11), initial position information of the communication target, and providing an angle deflection information instruction to the coarse tracking liquid crystal controller (2) according to a positional relationship between an initial position of the communication target and an initial position of the coarse tracking liquid crystal (1);

Step 2b, converting, by the coarse tracking liquid crystal controller (2), the angle deflection information instruction in step 1b into a control voltage, and controlling the coarse tracking liquid crystal (1) to point to the initial position of the communication target;

Step 3b, enabling a beacon beam of the communication target to pass through the coarse tracking liquid crystal (1), the beam shrinking system (3), the fine tracking liquid crystal (4), the beam splitter (6) and the second coupling system (9) in sequence to generate a spot on the photosensitive surface of the detector (10);

Step 4b, extracting, by the data analysis and instruction system (11), spot information output by the detector (10), and providing an angle deflection information instruction to the coarse tracking liquid crystal controller (2) according to a positional relationship between the spot position and the center of the detector (10); converting, by the coarse tracking liquid crystal controller (2), the angle deflection information instruction into a control voltage, and controlling the coarse tracking liquid crystal (1) to deflect;

Step 5b, repeating steps 3b to 4b until the spot position is located at the center of the detector (10), wherein the allowable deviation is small than or equal to the first positive number of pixels;

Step 6b, reducing, by the beam shrinking system (3), the diameter of the beam transmitted by the coarse tracking liquid crystal (1) and outputting parallel beams, and enabling all of the parallel beams to be transmitted through the fine tracking liquid crystal (4) and then pass through the beam splitter (6) and the second coupling system (9) in sequence to generate spots on the photosensitive surface of the detector (10);

Step 7b, extracting, by the data analysis and instruction system (11), spot information output by the detector (10), and providing an angle deflection information instruction to the fine tracking liquid crystal controller (5) according to a positional relationship between the spot position and the center of the detector (10);

Step 8b, converting, by the fine tracking liquid crystal controller (5), the angle deflection information instruction in step 7b into a control voltage, so that the fine tracking liquid crystal (4) points to a specific position;

Step 9b, repeating steps 6b, 7b and 8b until the spots on the detector (10) are always stabilized at the center of the detector (10) without drift, wherein the allowable deviation is smaller than or equal to the second positive number of pixels;

Step 10b, converting, by the first coupling system (7), an output beam of the single-mode optical fiber (8) into space parallel beams, and then transmitting the space parallel beams to the beam shrinking system (3) through the beam splitter (6) and the fine tracking liquid crystal (4);

Step 11b, enlarging, by the beam shrinking system (3), the beam diameter so that all of the output parallel beams are incident on the coarse tracking liquid crystal (1); and Step 12b, deflecting, by the coarse tracking liquid crystal (1), the beams to the direction of the communication target to establish a space laser link.

8. The method for realizing acquisition, tracking and pointing according to claim 7, wherein in step 6a, the beam shrinking system (3) reduces the diameters of the beams transmitted by the coarse tracking liquid crystal (1) by N times; and in step 11b, the beam shrinking system (3) enlarges the beam diameters by N times.

9. The method for realizing acquisition, tracking and pointing according to claim 8, wherein $b \leq 1/5$.

* * * * *